Jan. 4, 1944.  N. TRBOJEVICH  2,338,367
WORM GEARING
Filed Feb. 27, 1943   2 Sheets-Sheet 2
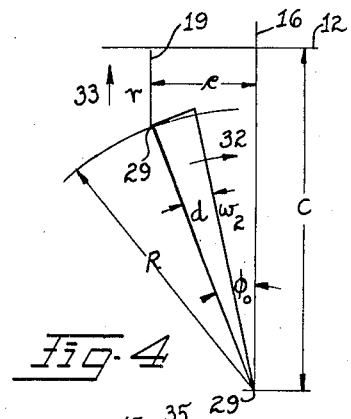
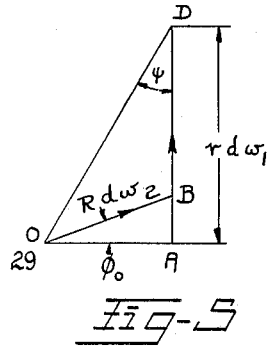
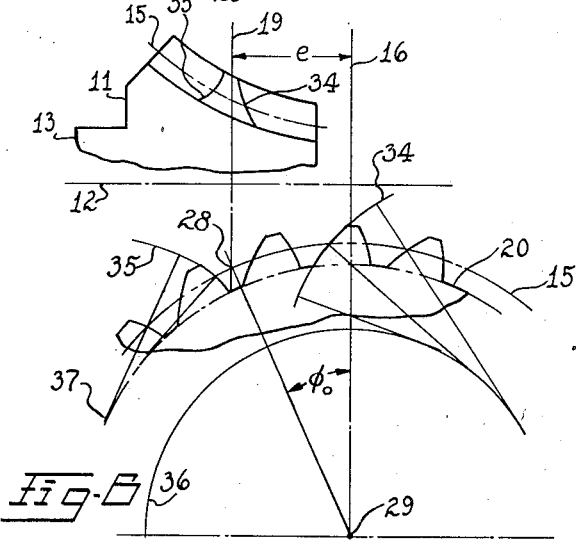
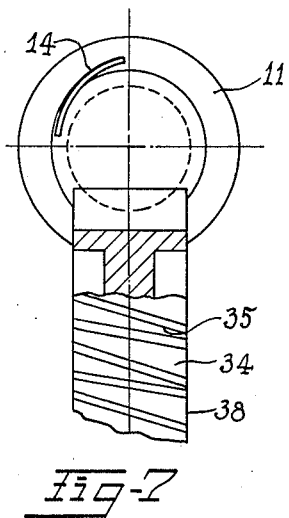
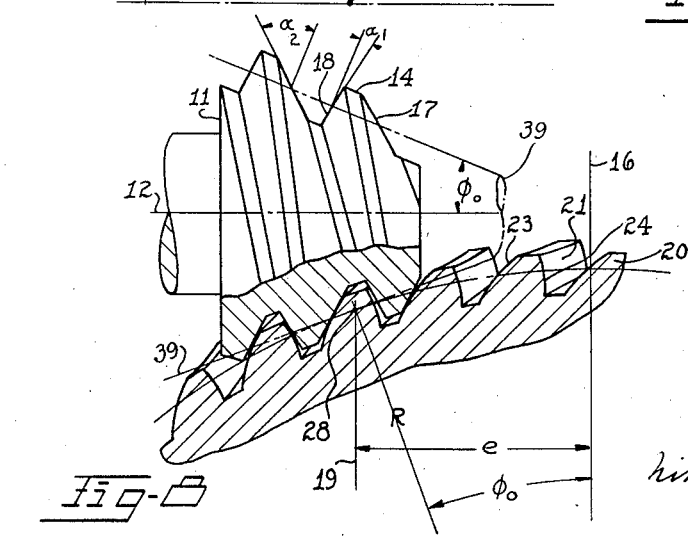
INVENTOR.
Nikola Trbojevich Patented Jan. 4, 1944

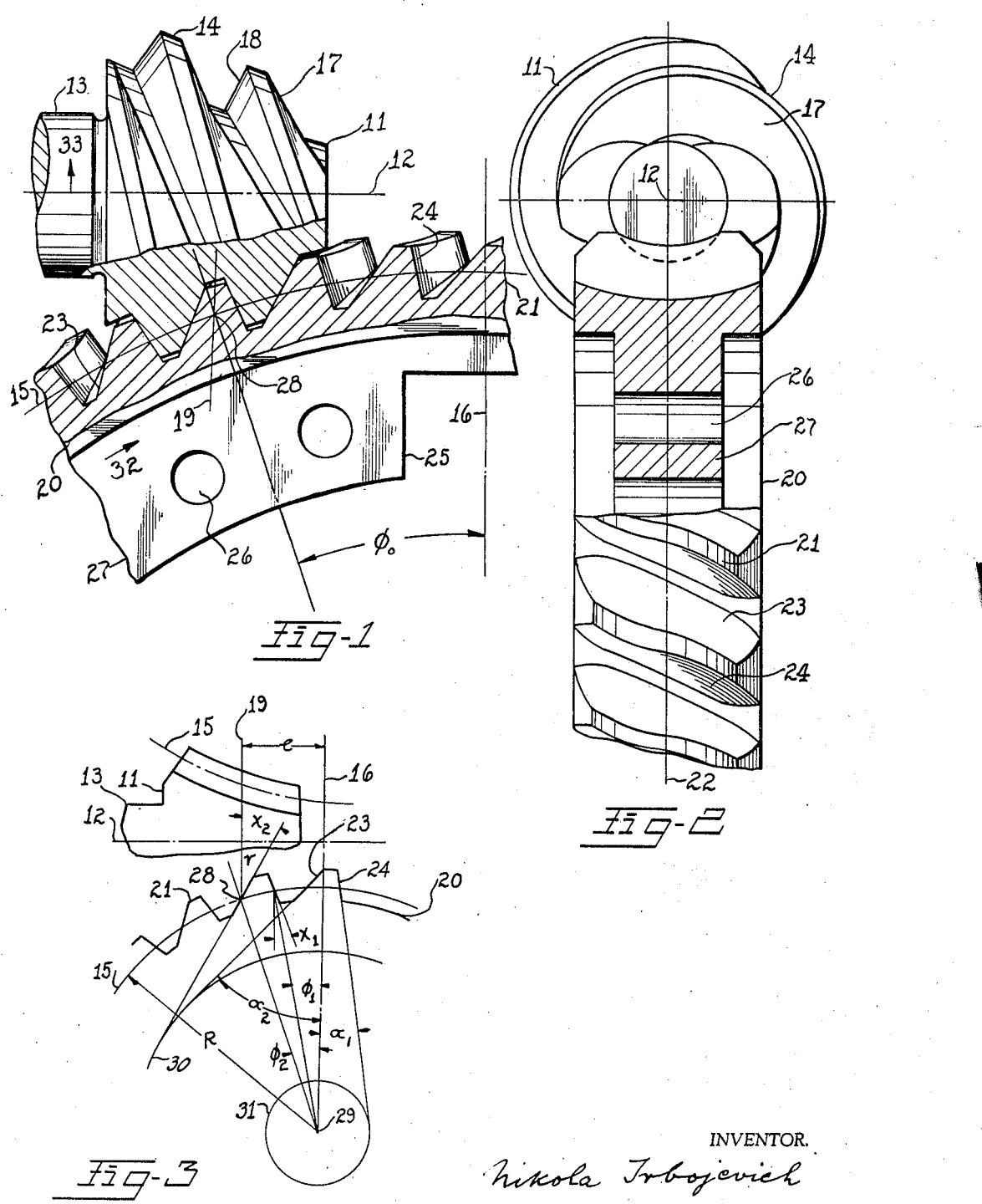

2,338,367

UNITED STATES PATENT OFFICE 2,338,367

WORM GEARING

Nikola Trbojevich, Toledo, Ohio

Application February 27, 1943, Serial No. 477,332

5 Claims. (Cl. 74—458)

The invention relates to an improvement in worm gearing of the globoid or hour glass type.

The invention deals with gearing characterized by the employment of a tapering truncated worm contacting the wheel member in an offset plane in which the tooth cross contours in both members are made asymmetrical for the purpose of substantially equalizing the normal radii of curvature at the opposite sides of the convolutions of the worm in its midplane and thereby rendering such gearing adapted to drive both in the forward and reverse directions with a substantially equal torque capacity.

The underlying mathematical principle consists in so determining the asymmetricity of the tooth cross contours in both members that a pronouncedly asymmetric worm drive, as regards the disposition of the worm relative to the wheel, will act as if it were symmetric, for the purpose of power transmission.

In this application I describe one principal and three secondary modifications of such asymmetric drives and in the description I make use of the material found in my copending applications Ser. Nos. 475,910 and 469,819 as well as my prior Patents Nos. 1,987,877, 1,972,544, and 1,759,968.

The object is to construct a worm drive in which the worm member is offset relative to the shortest line connecting the axes for the purpose of stiffening the carrier and to reduce the overhang of the worm.

Another object is to simplify the manufacture of the mating members and reduce the tool cost.

Still another object is to use short worms and worm shafts even in cases when the mating wheel is of a comparatively large diameter.

Another object is to use tapering driving worms for the purpose of simplifying the processes of mounting, assembly and adjustment.

A further object is to construct a truncated globoid worm having an asymmetric thread and variable pressure angles at its two sides so formed that the normal radii of curvature of the cross contours are substantially equal to each other at both sides of the thread as measured in the midplane of the worm.

In the drawings:

Figure 1 is a fragmentary plan view of the new worm and wheel of the doubly enveloping type;

Figure 2 is the sideview of Figure 1 showing the wheel member partly in cross section;

Figures 3, 4 and 5 are geometrical diagrams explanatory of the theory and used in deducing the Equations 1 to 15 incl. found in the description; and Figures 6, 7 and 8 are diagrammatic and fragmentary views of the Modifications Nos. 1, 2 and 3 respectively.

As shown in Figures 1 and 2, a truncated tapering globoid worm 11 having an axis 12 and a driving shank 13 integrally formed therewith is provided with a plurality of thread convolutions 14 extending all about its circumference. The said convolutions are equispaced along the meridians 15 upon a surface of revolution, the said meridians being all similar convergent circular arcs converging towards the gorge plane 16 in which the smallest diameter of the said surface of revolution is found. The cross contours of the said convolutions 14 as referred to the axis 12 present unequal and variable pressure angles at their two sides, in particular, the side 17 of the thread facing the gorge plane 16 begins with an unusually large pressure angle, about 45 degrees, and constantly diminishes as the said thread progresses towards the large end of the worm while the side 18 at the other side of the thread cross contour begins with a small pressure angle, about 5 degrees, and constantly increases towards the said large end. The initial pressure angles are so selected that when the cross section in the predetermined midplane 19, which is perpendicular to the axis of the worm is reached, the two pressure angles are equal to each other and the cross contour is approximately symmetrical in that particular plane.

Mating with the worm 11 is the conjugate worm gear 20 having a plurality of similar hollow curved teeth 21 of an asymmetrical cross contour and a variable thickness throughout their lengths. In the midplane 22 of the wheel, which is the plane of paper in Figure 1, the cross contours of the said teeth have a greater pressure angle on their sides 23 facing the small end of the worm and cooperating with the flanks 17 of the convolutions and a lesser pressure angle at the opposite sides 24 cooperating with the flanks 18 of the worm. The wheel 20 is usually made in the form of a bronze ring having a plurality of driving keyways 25, bolt holes 26 and a flange 27 of a reduced width for the purpose of fastening the said wheel to its drive shaft.

The above described drive is the principal modification of my invention and as was shown differs from the conventional Hindley type in the fact that the teeth in the principal plane 22 of the wheel containing the worm axis 12 are pronouncedly non-symmetrical and the worm is truncated and offset. The degree of the said lopsidedness in the mating teeth is preselected with a view of obtaining a correct engagement in the offset plane 19 and the pitch point 28 of the worm. Under correct engagement it is meant that in this particular spot the worm threads have equal normal radii of curvature at their opposite sides thus enabling one to rotate the worm and drive the wheel in either direction, forwardly or in the reverse, with approximately the same efficiency with respect to the generated surface stresses. This could not be done prior to this discovery by using a truncated, and therefore a short worm, meshing in an offset position relative to the wheel.

The method of manufacturing the members 11 and 20 respectively will now be explained. The method substantially follows the prevalent practice used in cutting of the well known Hindley type gearing, although in some respects it is simpler. First, a helical disk cutter is constructed to conform with the geometrical configuration of the midplane 22 of the wheel and according to my specification Ser. No. 475,910. The worm 11 is generated by positioning the plane of rotation of the cutter in which the cutting edges are situated in an axial plane of the worm, by rotating the cutter and the worm in a timed relation corresponding to their respective numbers of teeth and by simultaneously feeding the cutter in to the proper depth in a direction perpendicular to the worm axis. A tapering globoidal hob is also generated in a similar manner, provided with flutes to form cutting teeth, relieved and hardened.

The wheel 20 is hobbed by means of the taper hob above described in the conventional manner viz.: The hob is first correctly positioned relative to the wheel 20 in the offset plane 19 and the pitch point 28 and then, it is rotated in unison with the blank at the above mentioned ratio and simultaneously fed to the proper depth into the wheel in a direction perpendicular to the hob axis. The simplification of this process as compared with some other processes used for generating full length Hindley worms consists in the fact that due to the comparatively short length of the worm and hob and the above described improvement in the selection of the pressure angles, no undercut portions appear either in the worm or wheel and a simple method of feeding the cutting tools, both in the cases of worm and wheel, in the work is now possible. By this means the teeth in both members may be generated at their both sides and in a single operation.

I shall now briefly discuss the mathematical principle upon which this invention is based and give the necessary formulas needed for the calculation and dimensioning of the members. I shall also show certain modifications of the principal structure shown in Figures 1 and 2.

As shown in Figure 3 the worm wheel 20 having an axis 29 and a central plane 22 is provided with a plurality of asymmetrically formed teeth 21 each having two oppositely inclined flanks 23 and 24 respectively. The flanks 23 are all tangent to the larger circle 30 and the flanks 24 to the smaller circle 31, both of the said circles having a center in the wheel axis 29.

Let now $\alpha_2$ and $\alpha_1$ respectively denote the pressure angles of the said flanks 23 and 24, let $\chi_2$ and $\chi_1$ denote the corresponding or mating pressure angles in the worm and let further $\phi_2$ and $\phi_1$ be the corresponding angular offsets as measured from the gorge plane 16. Then, $$\chi_2 = \alpha_2 - \phi_2 \qquad (1)$$
$$\chi_1 = \alpha_1 + \phi_1 \qquad (2)$$

i. e. the two pressure angles in the worm are variable and one of them decreases while the other increases with an increasing value of $\phi$. Let the angular offset in the midplane 19 be denoted with $\phi_0$, then, $$\phi_2 = \phi_1 = \phi_0 \qquad (3)$$

and $$\left. \begin{array}{l} \chi_2 = \alpha_2 - \phi_0 \\ \chi_1 = \alpha_1 + \phi_0 \end{array} \right\} \qquad (4)$$

$$\chi_2 + \chi_1 = \text{const.} = \alpha_2 + \alpha_1 \qquad (5)$$

i. e. the sum of the variable pressure angles in the worm is a constant in any and all planes perpendicular to the axis. Furthermore, in the plane 19

$$\chi_2 = \chi_1 \qquad (6)$$

$$\alpha_2 - \phi_0 = \alpha_1 + \phi_0 \qquad (7)$$

$$\alpha_2 - \alpha_1 = 2\phi_0 \qquad (8)$$

$$\phi_0 = \frac{\alpha_2 - \alpha_1}{2} \qquad (9) \text{ Q. E. D.}$$

showing that the angle of offset is determined by the pressure angles of the wheel, and vice versa. In such a case, the pressure angles in the worm in the plane 19 are also fixed, $$\chi_1 = \chi_2 = \frac{\alpha_2 + \alpha_1}{2} \qquad (10) \text{ Q. E. D.}$$

The linear offset $e$ is also readily found, $$e = R \sin \phi_0 \qquad (11)$$

in which R is the pitch radius of the wheel.

The helix angle $\psi$ of the worm is variable and is a function of the offset angle $\phi$. In Figures 4 and 5 let the wheel and the worm rotate in the direction of the respective arrows 32 and 33 with the angular velocities $dw_2$ and $dw_1$. The infinitesimal displacement OB of the wheel, Figure 5 is then equal to $Rdw_2$ and the corresponding displacement of the worm $AD = rdw_1$, $r$ being the momentary radius of the worm. Hence from the triangle OAD $$\tan \psi = \frac{R \cos \phi \, dw_2}{r \, dw_1} \qquad (12)$$

The angular velocities of the wheel and worm are timed in the ratio of their respective numbers of teeth N and n as already stated:

$$N \, dw_2 = n \, dw_1 \qquad (13)$$

and from the Equation 12, $$\tan \psi = \frac{Rn}{rN} \cos \phi \qquad (14)$$

in which the variable $r$ may be eliminated by the use of the relation:

$$R \cos \phi + r = C \qquad (15)$$

in which C is the center distance or the shortest line connecting the axes of the worm and wheel.

It is now seen that in a drive of this type, i. e. in which the worm is offset relative to the wheel, the intermeshing teeth at the pitch point 28 do not move at right angles to each other even when the axes of the worm and wheel are disposed at right angles. This condition necessitates a corresponding correction in the evaluation of the helix angles as above stated.

This invention is subject to several modifications:

*Modification No. 1.*—As shown in Figure 6 the straight line tooth contours 23 and 24 in the central lamina of the wheel 20 in Figures 1 and 3 are now replaced by means of involutes 34 and 35 generated from two concentric base circles; a smaller one 36 corresponding to a greater pressure angle in the flank 34 and a larger circle 37 corresponding to the involute flank 35 of less pressure angle. Correspondingly, the cross contours in the convolutions of the worm are hollow inverted involutes developed from two different base circles.

*Modification No. 2.*—As shown in Figure 7, instead of a double enveloping nature of engagement existing between the intermeshing teeth of the worm and wheel such as was shown in Figures 1 and 2 in which both members are globoidal, a single enveloping engagement may be preferable in certain applications. In such a case, the worm 11 is a globoid and the wheel 38 is a helical gear comprising a cylindrical body and a plurality of asymmetric helical teeth of a constant cross contour thickness and depth throughout their lengths. In order to avoid an interference of the worm thread convolutions with the teeth of the said cylindrical gear, the worm is generated according to either one of my two method patents, viz. No. 1,987,877 referring to a method of gear shaping and No. 1,972,544 referring to a process of hobbing. Both of these processes incorporate the so-termed tangential feed method in which the cutting tool is translated in a direction perpendicular to the worm axis and tangentially relative to the worm, in a helical path. The cutter used in these instances to generate the truncated globoid worm, is the one described in my Ser. No. 475,910. The mating helical wheel 38 having asymmetrical teeth is generated by means of the taper hob, Ser. No. 469,819.

*Modification No. 3.*—In this case it is desired to design a singly enveloping worm drive by using a truncated conical worm offset relative the shortest line 16 connecting the cooperating axes of the worm and wheel. As shown in Figure 8, the worm 11 has a conical pitch surface 39 while the mating wheel 20 is of a globoidal form. This design resembles in all important details the structure shown in my Patent No. 1,759,968 with the exception that the pressure angles are asymmetrical in both members. The object is as previously stated, to insure that the worm will possess substantially equal normal radii of curvature at both sides of the convolutions 14 in the offset plane 19 containing the pitch point 28.

The worm 11 has a pitch cone 39 and an axis of rotation 12. The angular offset $\phi_0$ is equal to the cone angle of the said cone 39. The thread convolutions 14 are equally spaced along the generators of the said cone and show a lopsided construction having a considerably greater pressure angle $\alpha_2$ at the sides facing the gorge plane 16 and a lesser pressure angle $\alpha_1$ at their opposite sides. The teeth 21 of the wheel are globoidal, i. e., hollow curved and possess generated tooth flanks of the non-symmetric type. In particular, the sides 23 of the said teeth facing the small end of the worm 11 have a greater pressure angle and the opposite sides 24 have a lesser pressure angle. The wheel 20 is generated by means of a taper hob shown in Ser. No. 469,819.

What I claim is:

1. A mating worm and wheel having axes relatively non-intersecting and non-parallel in which the worm is a truncated tapering member having a plurality of spiral thread convolutions and the wheel is substantially a cylindrical body having a plurality of equispaced curved teeth, in which the worm contacts the wheel in an offset position relative to the shortest line connecting the said two axes and in which the teeth of both members have asymmetrical cross contours and substantially different pressure angles at their opposite sides.

2. A mating worm and wheel having axes relatively non-intersecting and non-parallel in which the worm is a tapering truncated member formed from a globoid and provided with a plurality of spiral thread convolutions about its circumference and the wheel is a substantially cylindrical body having a plurality of curved teeth disposed about its circumference, in which the worm contacts the wheel in an offset position relative to the shortest line connecting the said axes, in which the teeth of both members have asymmetrical cross contours and substantially different pressure angles at their two sides, the arrangement being such that the greater of the said two pressure angles in the wheel teeth is facing the small end of the worm.

3. A tapering globoidal worm having a plurality of equispaced thread convolutions wound about a tapering surface of revolution generated by a circular arc rotating about the worm axis in which the cross contours of the said convolutions as measured in any axial plane of the worm are substantially non-symmetrical relative the radii of the said arc and consist of two sets of inverted involutes, one set for each side of the thread, of unequal pressure angles, the curves of the first set being developed from a greater base circle and of the second set from a lesser circle, both concentric with the said arc.

4. A tapering worm having a plurality of equispaced thread convolutions wound about a tapering surface of revolution having an axis and a midplane perpendicular to the said axis in the middle of the said worm, in which the cross contours of the said convolutes have substantially different pressure angles at their two sides as measured in any axial plane of the worm and relative to the generators of the said surface and in which further the said inequality is so selected that the larger one of the two pressure angles faces the small end of the worm and the cross contour is substantially symmetrical in and about the said midplane.

5. A mating worm and wheel having axes relatively non-intersecting and non-parallel in which the worm is a truncated cone and is provided with a plurality of spiral thread convolutions about its circumference and the wheel is a substantially cylindrical body having a plurality of curved teeth disposed about its circumference, in which the worm contacts the wheel in an offset point relative to the shortest line connecting the said axes and in which the teeth of both members have asymmetrical cross contours and substantially different pressure angles at their two sides, the arrangement being such that the greater of the said two pressure angles in the wheel teeth is facing the small end of the worm.

NIKOLA TRBOJEVICH.